(12) United States Patent
Yoo et al.

(10) Patent No.: US 6,667,105 B1
(45) Date of Patent: Dec. 23, 2003

(54) COATING COMPOSITION FOR FORMING INSULATING FILMS, NON-ORIENTED ELECTRICAL STEEL SHEET WITH THE COATING COMPOSITION COATED THEREON, AND METHOD FOR FORMING THE INSULATING FILMS ON THE STEEL SHEET

(75) Inventors: Young-Jong Yoo, Kyungsangbook-do (KR); Sam-Kyu Chang, Kyungsangbook-do (KR); Seok-Joo Lee, Kyungsangbook-do (KR)

(73) Assignee: Pohang Iron & Steel Co., Ltd. (KR)

( * ) Notice: Subject to any disclaimer, the term of this patent is extended or adjusted under 35 U.S.C. 154(b) by 68 days.

(21) Appl. No.: 09/980,942

(22) PCT Filed: Jul. 12, 2000

(86) PCT No.: PCT/KR00/01414

§ 371 (c)(1),
(2), (4) Date: Nov. 15, 2001

(87) PCT Pub. No.: WO01/68778

PCT Pub. Date: Sep. 20, 2001

(30) Foreign Application Priority Data

Mar. 16, 2000 (KR) ........................................ 2000/13261

(51) Int. Cl.[7] ........................... B32B 15/08; B05D 3/02; C08L 25/14
(52) U.S. Cl. ...................... 428/463; 428/450; 428/457; 428/461; 428/462; 427/387; 427/388.1; 427/388.4; 524/261; 524/377; 524/417; 524/429
(58) Field of Search ................... 428/457, 461, 428/463, 462, 450; 427/487, 372.2, 384, 388.1, 388.4, 387, 397.7; 524/417, 428, 377, 261, 265

(56) References Cited

U.S. PATENT DOCUMENTS 5,955,201 A * 9/1999 Loudermilk et al. ........ 428/450

6,447,620 B1 * 9/2002 Komiyama et al. ......... 148/251

FOREIGN PATENT DOCUMENTS

| EP | 0926249 A1 | 6/1999 |
| JP | 53-017648 A | 2/1978 |
| JP | 06-330338 A | of 1994 |
| JP | 07-041913 A | 2/1995 |
| JP | 07-166365 A | 6/1995 |
| JP | 08-012919 A | 1/1996 |
| KR | 25106 B1 | 12/1987 |
| KR | 31208 B1 | 9/1989 |
| KR | 31219 B1 | 9/1989 |

OTHER PUBLICATIONS

Abstract, Chinese Patent No. CN1106851 "Compound Insulation and Fire–Proof Paint", published Aug. 16,1995, Applicant: Liu Xiaobing.

* cited by examiner

*Primary Examiner*—Monique R. Jackson
(74) *Attorney, Agent, or Firm*—Webb Ziesenheim Logsdon Orkin & Hanson, P.C.

(57) ABSTRACT

A coating composition for forming insulating films, a non-oriented electrical steel sheet with the coating composition coated thereon, and a method for forming the insulating films on the steel sheet, are disclosed. The coating composition includes the following ingredients for each 100 g of phosphoric acid of a primary aluminum phosphate solution. The coating composition comprises 28–98 g (solid weight) of an acid-soluble emulsion type acrylic-styrenic copolymer resin, 6–18 g of zinc nitrate, 4–13 g of a silicon additive, 18–35 g of ethylene glycol, and 3–11 g of non-ionic surfactant. The non-oriented electrical steel sheet is coated with the above coating composition. The coating composition is superior in roll coating workability and in film characteristics, and further, it is environmentally friendly and has superior aesthetics.

8 Claims, No Drawings

COATING COMPOSITION FOR FORMING INSULATING FILMS, NON-ORIENTED ELECTRICAL STEEL SHEET WITH THE COATING COMPOSITION COATED THEREON, AND METHOD FOR FORMING THE INSULATING FILMS ON THE STEEL SHEET

FIELD OF THE INVENTION

The present invention relates to a coating composition for forming insulating films, a non-oriented electrical steel sheet with the coating composition coated thereon, and a method for forming the insulating films on the steel sheet. More specifically the present invention relates to an organic-inorgarnic mixed coating composition for forming insulating films, a non-oriented electrical steel sheet with the coating composition coated thereon, and a method for forming the insulating films on the steel sheet, in which the roll spreading workability and the films characteristics are superior, and the aesthetics is excellent.

BACKGROUND OF THE INVENTION

Generally, non-oriented electrical steel sheets are used as the steel core for small electric motors and for transformers. These non-oriented electrical steel sheets are coated with insulating films before being supplied to users, so that the power loss due to the generation of eddy currents can be minimized.

The non-oriented electrical steel sheets which are supplied to the users after forming the insulating films generally undergo further processing, such as punching, high temperature annealing for relieving stress, automatic stacking, welding and the like so as to provide a shape to the steel sheets.

During the high temperature annealing for relieving the stress, the insulating films should not peel off, and should be highly heat resistant so as to maintain its insulating properties even at a high temperature. Further, the non-oriented electrical steel sheets are supplied directly to the users after forming the insulating films, and therefore, the aesthetics of the steel sheets has to be superior. In addition, it is required that the film adherence, corrosion resistance and continuous roll spreading workability be superior.

The conventional insulating films which are coated on non-oriented electrical steel sheets are roughly classified into: organic, inorganic, and organic-inorganic mixed insulating films.

The inorganic insulating films are superior in heat resistance compared with the organic and organic-inorganic mixed insulating films, but the punchability is not adequate. The organic insulating films are superior in punchability and adherence, but the films decompose and are destroyed during stress relieving annealing, with the result that the film adherence is aggravated.

Accordingly, there has been a demand for the development of organic-inorganic mixed insulating films which have the merits of the inorganic insulating films and the organic insulating films. Examples of this are disclosed in Korean Patents 25106, 31208 and 31219.

The composition of the organic-inorganic mixed insulating films generally contains chromic acid so as to ensure the requisite characteristics such as corrosion resistance, adherence and the like. Chromic acid thus contained not only gives harmful effects to humans during the manufacture of the coating composition and during the coating operation, but also causes environmental contamination such as water contamination and the like.

Accordingly, there has been researched and developed an insulating film which does not contain the chrome compound, and one example of this is disclosed in Japanese Patent Application Laid-open No. Hei-6-330338. In this technique, the main ingredient is an emulsion of primary aluminum phosphate and an organic resin having a particle size of 0.3~3.0 $\mu$m. Further, there are added boric acid and colloidal silica. Particularly, the particle size of the organic resin is controlled so that the heat resistance and the like can be improved.

Other examples in which the chrome compound is excluded are Japanese Patent Application Laid-open No. Hei-7-41913 and Hei-7-166365. In these cases, the main ingredients are an organic resin of a particle size of 0.3~3.0 $\mu$m and one or two selected from the group consisting of: aluminum phosphate, calcium phosphate and zinc phosphate. Further, boric acid is added.

The above techniques do not contain a chrome compound, and therefore, the films are said to be environmentally friendly, as well as being not harmful to humans, but their aesthetics are not desirable.

SUMMARY OF THE INVENTION

The present invention is intended to overcome the above described disadvantages of the conventional techniques.

Therefore it is an object of the present invention to provide an organic-inorganic mixed coating composition for forming an insulating film, in which the main ingredient is a phosphate and an acid-soluble emulsion type acrylic-syrenic copolymer, and there are further added the optimum amounts of elements for improving the coating characteristics, thereby making the roll spreading workability, the film characteristics and the aesthetics superior, as well as preventing the environment from being contaminated.

It is another object of the present invention to provide a non-oriented electrical steel sheet in which the coating composition composed of the ingredients is coated thereon, and therefore, the insulating properties of the coated film are superior, and the aesthetics is excellent.

It is still another object of the present invention to provide a method for forming the insulating films on non-oriented electrical steel sheet, in which the same properties as mentioned above are obtained.

Conventional coating compositions in which a chrome compound is used are not only harmful to humans, but also are undesirable environmentally. Therefore, organic-inorganic mixed coating compositions have been developed in which the use of the chrome compound is excluded. However, there is a limit to forming a reliable insulating film having superior film characteristics.

Accordingly, the present inventors carried out repeated research and studies to develop an organic-inorganic coating composition in which the use of the chrome compound is excluded, and in which superior film characteristics can be obtained. As a result, the inventors found that there can be obtained superior film characteristics if the main ingredients are composed of organic-inorganic mixed substances consisting of a phosphate and a low foamable and acid-soluble emulsion-type acrylic-styrenic copolymer resin, and if additives such as zinc nitrate, silicon, a non-ionic surfactant, and ethylene glycol are added in proper amounts.

In the present invention, the above cited additives are added in proper amounts to the main ingredients composed of organic-inorganic mixed substances consisting of a phosphate and a low foamable and acid-soluble emulsion-type acrylic-styrenic copolymer resin. Thus, when the coating composition is spread on the electrical steel sheet, the respective additives act to solidify the phosphate and the acrylic resin, and act to form an insoluble film exhibiting superior aesthetics. The superior film characteristics and continuous roll spreading workability cannot be obtained by simply using the respective additives. The proper proportions of each additive must be used to obtain these superior results.

In achieving the above objects, the coating composition according to the present invention includes for each 100 g of phosphoric acid of a primary aluminum phosphate solution: 28~98 g (solid weight) of an acid-soluble emulsion type acrylic-styrenic copolymer resin; 6~18 g of zinc nitrate; 4~13 g of a silicon additive; 18~35 g of ethylene glycol; and 3~11 g of non-ionic surfactant.

In another aspect of the present invention, the non-oriented electrical steel sheet according to the present invention is coated with the above coating composition.

In still another aspect of the present invention, the method for coating the insulating film according to the present invention includes the steps of: preparing a coating composition by adding the above stated ingredients; spreading the coating composition on a non-oriented electrical steel sheet; and subjecting the electrical steel sheet (thus coated) to a heat treatment at a temperature of 150~800° C. for 14~45 seconds.

DETAILED DESCRIPTION OF THE PREFERRED EMBODIMENTS

First, the coating composition for forming an insulating film will be described.

The primary aluminum phosphate solution is used for improving the heat resistance and the corrosion resistance of the coated film, and this can be prepared by adding aluminum hydroxide (which is a 3-valence metal compound) to phosphoric acid and making it dissolved. In the present invention, the manufacturing method and the addition ratio between them are not specially limited. The phosphoric acid may be the usual one, and the concentration should be preferably 85%.

The acrylic-styrenic copolymer resin which is used in the the organic-inorganic mixed coating composition should be acid-soluble, so that the uniformity of the spreading of the composition can be improved through the combination stability and a low viscosity of the emulsion.

The acid-soluble emulsion type acrylic-styrenic copolymer resin should have preferably a pH value of 4 or less, and more preferably the resin should consists of: 35% of an acrylic compound and 65% of a styrenic compound, while their average particle size should be about 0.2 μm.

In the present invention, the acid-soluble emulsion type acrylic-styrenic copolymer resin acts to improve the adherence to the steel sheet, and the flexibility of the coated film. However, if its content is too low, then the powderizing and the surface roughness are aggravated, thereby degrading the aesthetics. Further, the adherence cannot be strengthened, with the result that the addition effect cannot be expected. On the other hand, if its content is too excessive, then the insulating properties and the heat resistance are aggravated after the stress relieving heat treatment.

Therefore, in the present invention, the acid-soluble emulsion type acrylic-styrenic copolymer resin is limited to 28~98 g for each 100 g of phosphoric acid.

Meanwhile, if zinc nitrate is less than 6 g for each 100 g of phosphoric acid of the phosphate solution, the aesthetics such as color and shining are aggravated, while if it exceeds 18 g, the coated film car be peeled off after the stress relieving heat treatment.

Therefore, in the present invention, the content of zinc nitrate is limited to 6~18 g for each 100 g of phosphoric acid.

In the conventional coating solution in which the chrome compound is contained, a reduction reaction of the 6-valence chrome is carried out which produces a coated film having a light green color. Therefore, in the case where the color of the coated film is markedly different from the conventional light green color, the users may judge that the quality has been deteriorated. If there is no color, then the users may judge that there has been no coating applied. Therefore, it is the current trend that the appearance quality such as the color, the uniformity and the shining are also managed attentively.

In the present invention, the coating composition does not contain the chrome compound, but gives a film color which is similar to that of the conventional insulating films. In other words, without adding a separate pigment to the organic-inorganic mixed composition for controlling the color of the film, a light green-yellow color can be produced. For this phenomenon, a specific reason is not apparent, but the reason can be conjectured to be as follows.

That is, the coating solution which is prepared by adding the resin into the zinc nitrate aqueous solution shows a milky color at the initial stage. Then during the heat treatment, the resin component of the coating solution reacts with the inorganic component of the oxide layer of the steel sheet (the oxide layer having been formed before) to form a new composite material during the process of oxidation of the zinc ions at above the boiling point of zinc nitrate so as to form zinc oxide. This new composite material turns the color of the film to light green-yellow.

The silicon additive is the polyester-transformed polysiloxane silicon. This lowers the surface tension of the coating solution, so that the moisture state of the steel sheet can be improved. A preferable example of this is the commodity model BYK-348 of BYK Chemie company of Germany.

In the present invention, the content of the silicon additive is limited to 4~13 g per 100 g of phosphoric acid within the solution. If the content is less than 4 g, then the addition effect does not appear, with the result that the moisture state of the steel sheet becomes insufficient. On the other hand, if it exceeds 13 g, the aesthetics is aggravated.

The ethylene glycol acts to improve the external appearance by preventing the motley effect on the surface of the coiled steel sheet.

To describe it in detail, after carrying out a continuous roll spreading operation, motley patterns appear very frequently on the surface of the coiled steel sheet. This is due to the fact that when carrying out a heating at a relatively high temperature of 500~600° C., the material component having a boiling point of 100° C. is evaporated earlier than the other volatile components of the coating material. Accordingly, if ethylene glycol which has a boiling point higher than that of water is added in the optimum amount, then the motley effect can be prevented even during a long time operation. Consequently, a uniform external appearance can be obtained.

In the present invention, the content of ethylene glycol is limited to 18~359 per 100 g of phosphoric acid. If the content is less than 18 g, the aesthetic characteristics become insufficient, while if it exceeds 35 g, it does not completely evaporate even after the drying but partly remains, with the result that the corrosion resistance and the water resistance are aggravated due to the hydroxyl group.

A non-ionic surfactant is added for improving the continuous roll spreading workability, and a preferable example of this is the commodity model TRITON X-405 of Union Carbide Company of the U.S.

To describe it in detail, during the continuous roll spreading operation, the pressing between the rolls causes the temperature to rise, and therefore, the water component of the coating solution evaporates. Accordingly, the phosphate and the resin components are dried fast to be transited from the liquid phase to the solid phase, with the result that a sticking property is generated, and it cannot be reversed to the water-soluble property. In order to prevent this phenomenon, the non-ionic surfactant is added. However, if its content is less than 3 g per 100 g of phosphoric acid, the properties of the coating solution are altered around the rolls so as to be led to have a sticking property and so as for the solidified solution to be adhered on the surface of the rolls in thick layers, to the degree that the operation becomes impossible. On the other hand, if the content exceeds 11 g, a severe foaming problem is produced in the treating fluid, with the result that the aesthetics of the coated film are aggravated.

Accordingly, in the present invention, the content of the non-ionic surfactant per 100 g of phosphoric acid is limited to 3~11 g.

Conventionally, when spreading the coating solution on the non-oriented electrical steel sheet, if it is coated starting from the leading end of the weighty steel sheet coil, it becomes uneconomical. Therefore, first one kind of the coating solution is spread on a part of the coiled sheet, and then, the spreading operation is halted to coat the rest of the coiled sheet with another kind of the coating solution. Thus, the coating solution is left for several days without use, and thus if the coating solution is used thereafter, the coating solution might have lost the spreadability due to the fact that during the idle period of several days, a gel reaction has occurred between the inorganic chrome component and the resin component.

In contrast to this, if the resin-phosphate composite coating composition according to the present invention is used, the combination compatibility and the time stability become superior. Thus even when the coating solution of the present invention is used even after leaving it for one year, a superior spreading workability can be maintained. Accordingly, a treating solution saving effect and a waste solution minimizing effect can be obtained due to the long shelf life of the coating composition of the present invention.

Meanwhile, the present invention also provides a non-oriented electrical steel sheet on which the above described coating composition is coated.

Preferably, the coating composition is spread to a thickness of 0.7~2.8 μm on each face of the steel sheet. If the coated thickness is less than 0.7 μm, then the desired insulating strength cannot be obtained, while if it exceeds 2.8 μm, then a welding problem or the like may occur.

Next, the present invention also provides a method for forming an insulating film by coating the above described coating composition.

To describe it in more detail, in the present invention, water is added to the above described coating composition to form a coating solution of the optimum concentration. Under this condition, the present invention is not limited to a particular concentration of the coating solution.

The above described coating solution is spread on the surface of the non-oriented electrical steel sheet. Preferably, the dried coated thickness should be 0.7~2.8 μm, and this range ensures the insulating strength and the weldability.

The non-oriented electrical steel sheet thus coated is annealed at a temperature of 150–800° C. for 14~45 seconds, thereby obtaining an insulating film of superior characteristics. This heat treatment temperature (the temperature of the heat treatment furnace) and the heat treatment time act as factors for deciding the film characteristics.

That is, in the present invention, the heat treatment temperature is limited to 150–800° C. If the temperature is below 150° C., the heat treatment becomes insufficient, with the result that the moisture remains, or that even if a coated film is formed, the productivity is aggravated. On the other hand, if the temperature exceeds 800° C., the control of the heat treatment temperature becomes difficult, with the result that not only non-uniform coating is done, but also an appearance defect is produced.

Meanwhile, in the present invention, the heat treatment time is limited to 14~45 seconds. If the heat treatment is carried out for less than 14 seconds at the highest allowable temperature of 800° C., the heat treatment becomes imperfect, with the result that the moisture remains. On the other hand, if the heat treatment is carried out for more than 45 seconds at the minimum allowable temperature of 150° C., then the coating material which has been chemically bonded with the oxide layer is oxidized, with the result that the color of the film is turned to black-brown to black, thereby generating color defects.

Most preferably, the heat treatment is carried out to a temperature of 550~750° C. for 18~37 seconds.

As described above, the present invention provides an organic-inorganic mixed coating composition in which the roll spreadability and the insulating film characteristics are superior. Further, the present invention provides a non-oriented electrical steel sheet coated with the above coating composition, in which the aesthetics, the adherence, the corrosion resistance and the weldability are superior.

Now the present invention will be described in more details based on actual examples.

EXAMPLE 1

Coating compositions for forming insulating films were prepared by varying the compositions as shown in Table 1 below for each 100 g of phosphoric acid of a primary aluminum phosphate solution (DYP-30), and then, these coating compositions were aged for 3 days. Then these coating compositions were spread on non-oriented electrical steel sheets (0.5 mm thick, and containing 1.0% of Si). Then these coated steel sheets were heat treated at a temperature of 550° C. for 30 seconds, and thus, non-oriented electrical steel sheets were obtained on which insulating films of a thickness of about 2.1 μm were coated respectively.

For these coated steel sheets, the characteristics of the coated insulating films were measured, and the measured results are shown in Table 2 below. Under this condition, the specific measuring methods were as follows.

Meanwhile, as shown in Table 2 below, the corrosion resistance was classified into: the case where the generation of rust was absent on the surface of the insulating film; the case where the generation of rust was present partly, and the case where the generation of rust was widely prevalent. These cases were indicated by ○, Δ and X respectively. Further, as to the peeling of the films, the case where the peeling was absent was indicated by o, and the case where the peeling was present was indicated by X. Further, the case where the aesthetics was superior was indicated by o, and the case where aesthetics was inferior was indicated by X.

TABLE 1

| | Coating composition (unit: g) | | | | |
|---|---|---|---|---|---|
| | ① | ② | ③ | ④ | ⑤ |
| Inventive example | | | | | |
| 1 | 66 | 8 | 5 | 25 | 12 |
| 2 | 57 | 6 | 6 | 29 | 14 |
| Comparative example | | | | | |
| 1 | 11 | 7 | 10 | 20 | 13 |
| 2 | 152 | 9 | 8 | 26 | 11 |
| 3 | 77 | 18 | 6 | 31 | 8 |
| 4 | 60 | 1 | 7 | 26 | 12 |
| 5 | 82 | 7 | 1 | 29 | 14 |
| 6 | 59 | 11 | 19 | 27 | 13 |
| 7 | 76 | 8 | 5 | 77 | 15 |
| 8 | 69 | 7 | 7 | 2 | 12 |
| 9 | 68 | 10 | 6 | 24 | 1 |
| 10 | 74 | 9 | 7 | 22 | 31 |

* In the above table,
① indicates emulsion type acrylic-styrenic resin (PA-P40),
② indicates silicon additive (BYK-348),
③ indicates non-ionic surfactant (TRITON X-405),
④ indicates ethylene glycol, and
⑤ indicates zinc nitrate.

(1) Stress relieving heat treatment was carried out at 750° C. under a 100% $N_2$ gas atmosphere.

(2) The external appearances were evaluated by collectively visually observing motley patterns, stripes, shining, and the color. As motley patterns and stripes were absent, and as a shining and a light green-yellow color were present, so much the quality of the coated film was thought to be superior. If the color of the coated film was non-chromatic or dark like the base sheet, if stripes were present and if the shining was too low so as to make the users evade the product, then the external appearance of the coated film was evaluated to be inferior.

(3) The insulating strength was evaluated by means of the electric current value (in amperes) when an input current (0.5 V and 1.0 A) was supplied under a pressure of 300 psi.

(4) The adherence (mmφ) was evaluated by the minimum arc diameter which did not show any peeling when the annealed steel sheets were surrounded around rods (10, 20, 30, . . . , 100 mmφ) and the surrounded rods were bent by an angle of 180 degrees.

(5) The corrosion resistance was evaluated by visually observing the presence or absence of rust when the coated steel sheets were left indoor for one year and exposed outdoor for three months.

(6) The peeling of the coated film was evaluated by the presence or absence of peeling when an adhesive tape (poly propylene) was attached-detached on and from the annealed films.

As can be seen in Table 2 below, in the case of the inventive examples 1 and 2 (in which the conditions of the present invention were met), not only the roll coating continuation workability but also the film characteristics such as the aesthetics, the insulating strength, the adherence, the corrosion resistance and the heat resistance (the property that the film was not peeled and the insulating strength was not lowered after the heat treatment) were superior. This owes to the fact that the resin and the inorganic additives were filled into between the phosphate crystals, thereby making the structure of the film dense.

In contrast to this, in the case of the comparative example 1 in which the addition of the emulsified acrylic-styrenic resin (PA-P40) was insufficient, the aesthetics and the adherence were inferior. In the case of the comparative example 2 in which the resins addition was excessive, the insulating strength and the heat resistance were not satisfactory after the stress relieving heat treatment.

Meanwhile, in the cases of the comparative examples 3 and 4 in which the addition of the silicon additive departed from the range of the present invention, the aesthetics was not adequate.

TABLE 2

| | Film characteristics | | | | | | |
|---|---|---|---|---|---|---|---|
| | Before stress relieving heat treatment | | | | | After stress relieving heat treatment | |
| | Aesthetics | Insulating Strength (Amps.) | Adherence (mm Ø) | Corrosion Resistance | | Film Peeling | Insulating Strength (Amps.) |
| | | | | left indoor | exposer outdoor | | |
| Inventive example | | | | | | | |
| 1 | o | 0.09 | 10 | o | o | o | 0.31 |
| 2 | o | 0.08 | 10 | o | o | o | 0.29 |
| Comparative example | | | | | | | |
| 1 | X | 0.10 | 40 | o | o | o | 0.28 |
| 2 | o | 0.18 | 10 | Δ | Δ | X | 0.98 |
| 3 | X | 0.07 | 20 | o | o | o | 0.29 |
| 4 | X | 0.08 | 20 | o | o | o | 0.30 |
| 5 | | | — | | | | |
| 6 | X | 0.11 | 20 | o | o | o | 0.33 |
| 7 | X | 0.13 | 20 | X | X | o | 0.35 |
| 8 | X | 0.30 | 20 | Δ | Δ | o | 0.37 |
| 9 | X | 0.17 | 20 | o | o | o | 0.39 |
| 10 | o | 0.18 | 20 | o | o | X | 0.80 |

Further, in the case of the comparative example 5 in which the addition of the non-ionic surfactant (TRITONX-405) was insufficient, the continuous coatability was not adequate, to the degree that the film could not be formed. In the case of the comparative example 6 in which its addition was excessive, the aesthetics of the coated film was not desirable.

Further, in the case of the comparative example 7 in which the addition of ethylene glycol was excessive, the corrosion resistance and the aesthetics were not adequate. In the case of the comparative example 8 in which its addition was insufficient, the corrosion resistance was inferior, and the aesthetics was not desirable because motley patterns were appeared.

Further, in the case of the comparative example 9 in which the addition of zinc nitrate was insufficient, the aesthetics was inferior, while in the case of the comparative example 10 in which its addition was excessive, the heat resistance was not adequate by showing the film peeling and the like.

EXAMPLE 2

A film coating composition which was composed like that of the inventive example 1 of Example 1 was aged for 3 days. This coating composition was uniformly spread on non-oriented electrical steel sheets (0.5 mm thick, and containing 1.0% of Si by varying the coating thickness. Then the test pieces were annealed at 550° C. for 30 seconds, and thus, the coated films were various as shown in Table 3 below. Then the non-oriented electrical steel sheets on which the coated films were different in the thickness were measured as to their film characteristics such as insulating strength, corrosion measured by applying the TIG welding (welding current: 150 A, electrode: pure-W (3,2 mmφ), electrode gap: 0.35 mm, and the welding speed: 15 mm/sec), and that the external appearance of the bead part after the welding and the generation of blow holes were visually observed.

In Table 3 below, in evaluating the corrosion resistance, the heat resistance and the weldability, if the evaluation value was superior, it was indicated by ○, while if the value was inferior, it was indicated by X.

As can be seen in Table 3 below, in the case of the inventive examples 3 to 5 in which the film thicknesses were controlled to proper values, the film characteristics were superior, and particularly, the weldability was superior.

In contrast to this, in the case of the comparative example 11 in which the film thickness was too thin, the corrosion resistance and the insulating strength were not adequate. In the case of the comparative example 12 in which the film thickness was too thick, the weldability and the heat resistance were inferior.

TABLE 3

| | | Film Characteristics | | | | | |
|---|---|---|---|---|---|---|---|
| | | Insulating Strength (Amps.) | | | | | |
| | Film Thickness (μm) | Before stress relieving heat treatment | After stress relieving heat treatment | Corrosion Resistance | | Film Peeling | Weldability |
| | | | | Left indoor | Exposed outdoor | | |
| Inventive Example | | | | | | | |
| 3 | 1.0 | 0.16 | 0.39 | ○ | ○ | ○ | ○ |
| 4 | 2.1 | 0.09 | 0.31 | ○ | ○ | ○ | ○ |
| 5 | 2.8 | 0.04 | 0.28 | ○ | ○ | ○ | ○ |
| Comparative Example | | | | | | | |
| 11 | 0.2 | 0.93 | 0.99 | X | X | ○ | ○ |
| 12 | 6.8 | 0.02 | 0.90 | ○ | ○ | X | X |

EXAMPLE 3

A coating composition which was composed like that of the inventive example 2 of Example 1 was prepared, and it was aged for three days. This composition was coated on non-oriented electrical steel sheets (0.5 mm thick) uniformly and continuously. Then these test pieces were annealed at various heat treatment conditions as shown in Table 4 below, thereby manufacturing non-oriented electrical steel sheets.

As shown in Table 4 below, in the case of the inventive example 6 in which the heat treatment conditions were properly controlled, the insulating film was thick to the value of about 2.3 μm. and the film characteristics were superior.

TABLE 4

| | Heat treatment conditions | | |
|---|---|---|---|
| | Temperature (° C.) | Time | Remarks |
| Inventive example | | | |
| 6 | 550 | 30 | Film formed in 2.3 μm |
| Comparative example | | | |
| 13 | 150 | 50 | Over-curing |
| 14 | 800 | 11 | Film is insufficiently formed |

In contrast to this, in the case of the comparative example 13 in which the heat treatment was too lengthy, the coated material which was contacted to the oxide layer was oxidized to be turned to a black-brown to black color, thereby showing a severe appearance inadequacy.

Meanwhile, in the case of the comparative example 14 in which the heat treatment time was too short under the given heat treatment temperature, the formation of the film was insufficient due to the insufficient heat treatment.

According to the present invention as described above, the film characteristics such as aesthetics, insulating strength, heat resistance and the like are superior. Further, the contamination of the environment can be prevented, and the coated film is immune from property degradations after elapsing of time. Thus, the organic-inorganic mixed coating composition of the present invention is useful in the manufacture of non-oriented electrical steel sheet.

What is claimed is:

1. A coating composition comprising for each 100 g of phosphoric acid of a primary aluminum phosphate solution:
   28–98 g of an acid-soluble emulsion acrylic-styrenic copolymer resin;
   6–18 g of zinc nitrate;
   4–13 g of a silicon additive;
   18–35 g of ethylene glycol; and
   3–11 g of non-ionic surfactant.

2. The coating composition as claimed in claim 1, wherein the acid-soluble emulsion acrylic-styrenic copolymer resin has a pH value of 4 or less.

3. The coating composition as claimed in claim 2, wherein the acid-soluble emulsion acrylic-styrenic copolymer resin is composed of 35% of an acrylic compound and 65% of a styrenic compound.

4. The coating composition as claimed in claim 1, wherein the acid-soluble emulsion acrylic-styrenic copolymer resin is composed of 35% of an acrylic compound and 65% of a styrenic compound.

5. A non-oriented electrical steel sheet comprising:
   a coating film formed by using a coating composition,
   the coating composition comprising for each 100 g of phosphoric acid of a primary aluminum phosphate solution;
   28–98 g (solid weight) of an acid-soluble emulsion acrylic-styrenic copolymer resin;
   6–18 g of zinc nitrate;
   4–13 g of a silicon additive;
   18–35 g of ethylene glycol; and
   3–11 g of non-ionic surfactant.

6. The non-oriented electrical steel sheet as claimed in claim 5, wherein the coating composition is coated to a thickness of 0.7–2.8 μm on each face of the steel sheet.

7. A method for coating an insulating film on a non-oriented electrical steel sheet, comprising the steps of:

preparing a coating composition by adding for each 100 g of phosphoric acid of a primary aluminum phosphate solution: 28–98 g of an acid-soluble emulsion acrylic-styrenic copolymer resin, 6–18 g of zinc nitrate, 4–13 g of a silicon additive, 18–35 g of ethylene glycol, and 3–11 g of non-ionic surfactant;

spreading the coating composition on the non-oriented electrical steel sheet to provide a coated electrical steel sheet; and subjecting the coated electrical steel sheet to a heat treatment at a temperature of 150–800° C. for 14–45 seconds.

8. The method as claimed in claim 7, wherein the coating composition is coated to a thickness of 0.7–2.8 μm on each face of the steel sheet.

* * * * *

UNITED STATES PATENT AND TRADEMARK OFFICE
CERTIFICATE OF CORRECTION

PATENT NO. : 6,667,105 B1  Page 1 of 1
DATED : December 23, 2003
INVENTOR(S) : Young-Jong Yoo et al.

It is certified that error appears in the above-identified patent and that said Letters Patent is hereby corrected as shown below:

Title page,
Item [22], International Filing Date, "July 12, 2000" should read -- Dec. 7, 2000 --.

Column 10,
Line 38, "28-98 g" should read -- 28-98g solid weight --.

Column 11,
Line 8, "28-98 g" should read -- 28-98g solid weight --.

Signed and Sealed this

Twentieth Day of April, 2004

JON W. DUDAS
*Acting Director of the United States Patent and Trademark Office*